United States Patent

Kakizawa

[11] Patent Number: 5,915,014
[45] Date of Patent: Jun. 22, 1999

[54] COMMUNICATION SYSTEM

[75] Inventor: Katsuhiro Kakizawa, Yokohama, Japan

[73] Assignee: Canon Kabushiki Kaisha, Tokyo, Japan

[21] Appl. No.: 08/725,287

[22] Filed: Oct. 2, 1996

[30] Foreign Application Priority Data

Oct. 4, 1995 [JP] Japan ................................. 7-257779

[51] Int. Cl.$^6$ ................................................. H04M 1/00
[52] U.S. Cl. ........................ 379/377; 379/156; 379/162; 379/163; 379/382
[58] Field of Search .................... 379/377, 382, 379/3, 6, 29, 156, 164, 165, 162, 163, 157, 396, 253, 284

[56] References Cited

U.S. PATENT DOCUMENTS

| | | |
|---|---|---|
| 4,057,693 | 11/1977 | Angner et al. .......................... 379/162 |
| 4,311,880 | 1/1982 | Balzer et al. ........................... 379/162 |
| 4,434,326 | 2/1984 | Koeck et al. ............................. 379/29 |
| 4,823,377 | 4/1989 | Sugiura et al. ......................... 379/165 |
| 5,095,504 | 3/1992 | Nishikawa et al. ..................... 379/162 |
| 5,144,653 | 9/1992 | Masuoka ................................. 379/165 |
| 5,388,153 | 2/1995 | Burger et al. .......................... 379/156 |
| 5,410,593 | 4/1995 | Kamota .................................. 379/162 |
| 5,483,584 | 1/1996 | Hayashi et al. ........................ 379/162 |
| 5,577,114 | 11/1996 | Morita et al. .......................... 379/377 |

*Primary Examiner*—Krista Zele
*Assistant Examiner*—Jacques M. Saint-Surin
*Attorney, Agent, or Firm*—Morgan & Finnegan, LLP

[57] ABSTRACT

An apparatus and a method of setting and confirmation of a value indicative of an on-hook period of a terminal is provided. The value is used as a threshold when distinguishing a hooking pulse for putting communication on hold which is issued by the terminal, from disconnection of a call on the terminal.

32 Claims, 2 Drawing Sheets

COMMUNICATION SYSTEM

BACKGROUND OF THE INVENTION

The present invention relates to a communication system having a function of measuring the duration of disconnection period of a line.

A key telephone system that accommodates a two-wire type standard telephone holds data for discriminating a hooking operation for requesting to hold a line from a hooking (on-hook operation) for disconnecting the line when a call is completed. When an operator of the standard telephone requests holding, he or she goes on-hook for a short period of time in consideration of a value set as this data. Alternatively, the operator presses a switch or button during a conversation, which is arranged on the standard telephone and is used for setting the telephone an on-hook state for a predetermined period of time, thus outputting a hooking signal.

In a case where a call is disconnected so often due to an on-hook period which is too long when the operator performs the hooking operation during a telephone conversation, or when duration of the hooking signal output by depressing the button and the like is always longer than the set value, a person who is in charge of maintenance of the key telephone system updates data for the set value.

However, in the key telephone system, in order to check whether or not the set value is adequate, it is required to make a telephone call to an outside line or to another terminal via an extension line, by using the standard telephone. If a conversation is still interrupted, after the set value is updated, the person in maintenance must update the value using a master telephone, a maintenance console, or the like, and make a telephone call again using the standard telephone. This operation for updating the set value must be repeated until a call is no longer interrupted by the hooking operation during a conversation.

There is another problem associated with the above-mentioned operation for confirming adequacy of the set value. Since this kind of operation is troublesome, the value tends to be set relatively long so that a call is not readily disconnected. In such case, when a user completes the call to a given person and tries to make another call to another person, the on-hook operation that was intended to disconnect the line may be erroneously determined as a hooking operation for holding the line, and the user may be confused.

SUMMARY OF THE INVENTION

It is an object of the present invention to provide system which reliably detects a hooking operation.

It is another object of the present invention to provide a system reliably distinguishes termination of communication from a holding request.

It is still another object of the present invention to provide a system registers the hooking period more accurately.

It is still another object of the present invention to provide a system improves operability of the system when registering the hooking period.

Other objects of the present invention will become apparent from the following description of the embodiments.

DETAILED DESCRIPTION OF THE PREFERRED EMBODIMENTS

Figure 1:
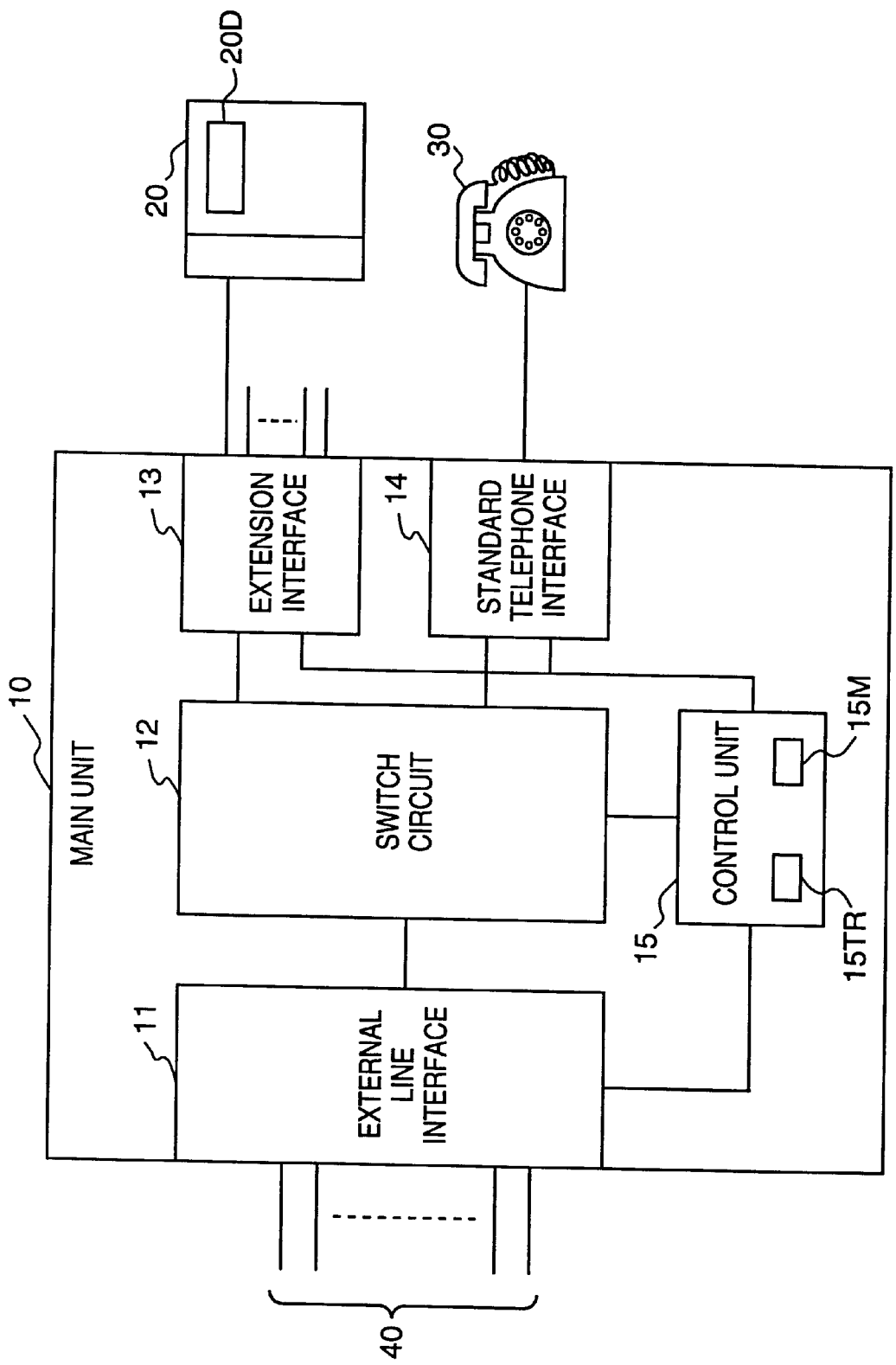
FIG. 1 is a block diagram showing the arrangement of a key telephone system to which the present invention is applied.

FIG. 1 is a block diagram showing the arrangement of a key telephone system to which the present invention is applied. Referring to FIG. 1, reference numeral 10 denotes a main unit of the key telephone system; 11, an external-line interface circuit for interfacing with telephone lines 40; 12, a switch circuit for connecting and forming a speech path between an extension interface circuit 13 (to be described later) and the external line interface circuit 11; and 13, an extension interface circuit for providing an interface with an extension telephone 20.

Reference numeral 14 denotes a standard-telephone interface circuit for interfacing with a standard telephone 30; and 15, a control unit for controlling overall of the system. Note that reference numeral 20 denotes the extension telephone having a display for visually displaying various kinds of information; and 30, a two-wire type standard telephone (to be referred to as an SLT hereinafter).

The extension telephone 20 accommodated in the extension interface circuit 13 of the key telephone system with the above arrangement is a telephone, which allows maintenance operations such as a data setting operation in addition to normal speech communications.

Explained below is the operation executed when a request for starting a hooking-test mode is issued from the extension telephone 20 to the control unit 15 via the extension interface circuit 13, by dialing a specific number or operating a function button on the extension telephone 20.

Figure 2:
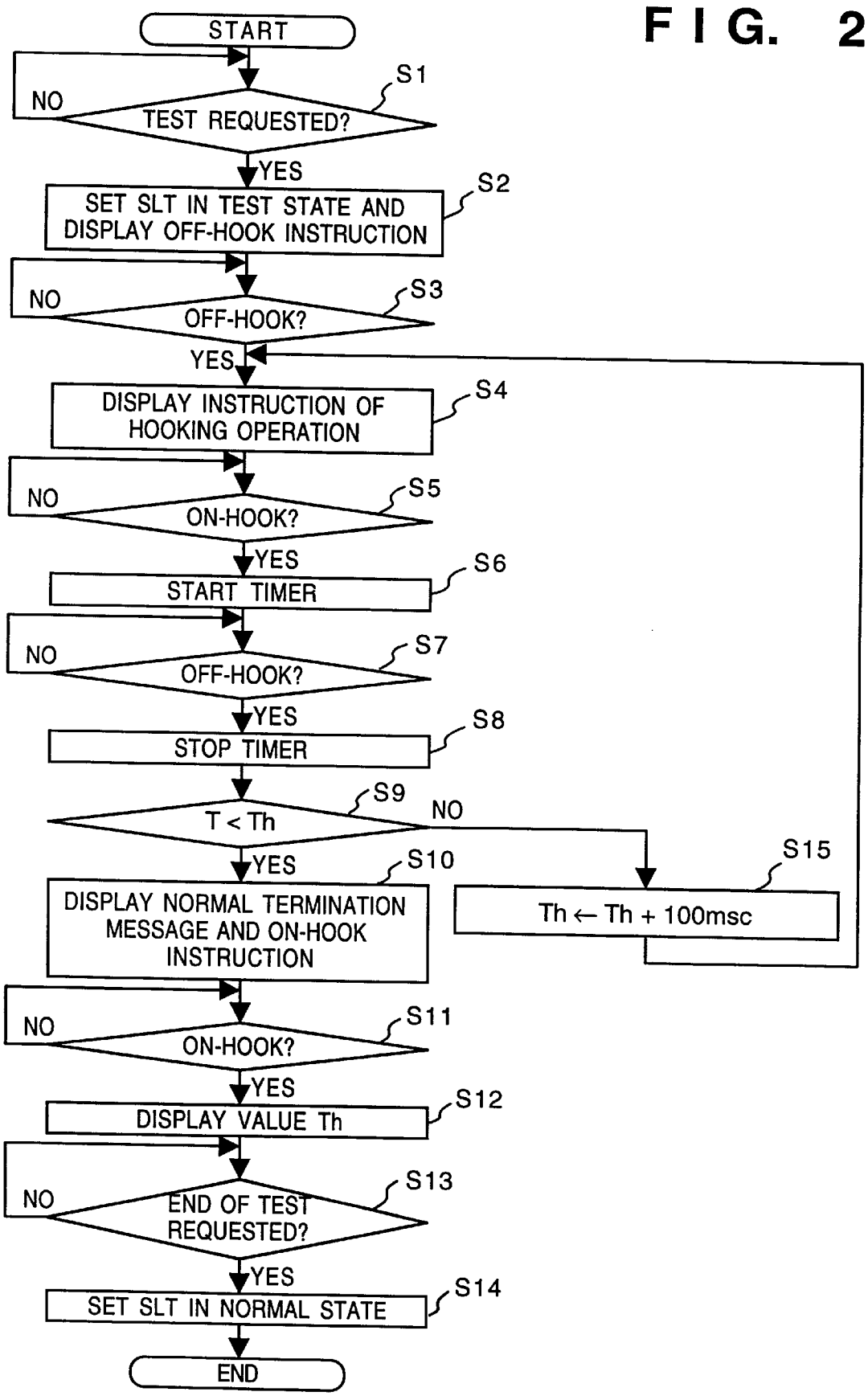
FIG. 2 is a flow chart showing the hooking test processing according to an embodiment of the present invention.

FIG. 2 is a flow chart showing the operation executed when the hooking-test mode is required to start in the key telephone system of the present invention. Note that a value for distinguishing a hooking pulse associated with the hooking operation from that for disconnecting a call is initially set to be 600 msec (which will be referred to as Th) in a management memory 15M, and this set value can be changed in units of 100 msec.

Upon reception of the request for starting the hooking test mode from the extension telephone 20 (YES in step S1), the control unit 15 sets the management memory 15M for the SLT 30 to a hooking-test state, thus inhibiting a call to the SLT 30 from another extension telephone or a call to the SLT 30 via the telephone line 40, and the operation for originating a call from the SLT 30. Also, the control unit 15 controls to display, a message on a display 20D of the extension telephone 20, which prompts a user to perform an off-hook operation of the SLT 30 (step S2). When the control unit 15 detects the off-hook operation of the SLT 30 (YES in step S3), a message indicating that the user is going to perform a hooking operation at the SLT 30 is displayed on the display 20D of the extension telephone 20 (step S4).

When the control unit 15 detects an on-hook operation at the SLT 30, while monitoring the hooking operation at the SLT 30 (YES in step S5), the control unit 15 starts a timer 15TR to operate (step S6). When the control unit 15 detects an off-hook operation in step S7, it stops the operation of the timer 15TR (step s8).

The control unit 15 compares a timer value T obtained at the end of the on-hook state with the value Th stored in the management memory 15M (step S9). If T>Th, the flow advances to step S10, and a message indicative of a normal termination of the hooking test is displayed on the extension telephone 20, thus prompting the on-hook operation of the SLT 30. Upon detecting an on-hook operation of the SLT 30 (YES in step S11), the set value Th is displayed on the display 20D of the extension telephone 20 (step S12), and the control unit 15 waits for an end request of the test from the extension telephone 20 (step S13).

Upon reception of a request for ending the test from the extension telephone 20, which is caused by dialing the special number or operating a function button on the extension telephone 20, the management memory 15M for the SLT 30 in the control unit 15, and the SLT 30 itself are restored to a normal state (step S14), thus ending this processing. In this step, restriction of the call termination/origination set in step S2 is canceled.

If it is determined in step S9 that the timer value T is equal to or larger than the value Th, the flow advances to step S15, and the above-mentioned set value is incremented by 100 msec which is regarded as an updating unit. After this processing, the flow returns to step S4. A hooking operation of the SLT 30 is prompted again, and the processings from step S4 to step S9 are repeated to update the set value Th in the management memory 15M, so that a pulse obtained by the hooking operation at the SLT 30 is recognized as a hooking pulse issued for holding a line.

The control unit 15 uses the set value Th, which has been updated as described above, so as to distinguish a request for holding a line from a request for disconnecting a telephonic communication. More specifically, when the SLT 30 goes on-hook during communication, the control unit 15 measures the on-hook period. Thereafter, when the SLT 30 returns to an off-hook condition, the control unit 15 compares the on-hook period $T_{ON}$ with the set value Th. As a result of this comparison, if $T_{ON}$>Th, the control unit 15 controls the switch circuit 12 to set the SLT 30 in a holding state. On the other hand, if $T_{ON} \leq$Th, the control unit 15 controls the switch circuit 12 to terminate the on-going communication executed by the SLT 30, thereby disconnecting a connection with the SLT 30.

As described above, the setting and confirmation of a value indicative of duration of time at which an on-hook state is being kept, is performed. The value is used for distinguishing a hooking pulse for putting communication on hold from disconnection of a call, when measuring an output period of the hooking pulse issued by a hooking operation performed at the standard telephone accommodated in the system. Hence, the operation for the setting and confirmation of the value can be simplified, and precision of the setting can be improved.

Note that the present invention is not limited to the above embodiment. For example, in place of updating the value Th in units of 100 msec, a value obtained by incrementing the timer value T of the timer 15TR by 20% may be used as Th. Furthermore, the processings from step S4 to step S9 are repeated N times, and Th may be determined if T>Th is successively satisfied a predetermined number of times during those processings.

With these operations, precision of the setting for the value corresponding to duration of time at which an on-hook state remains, can be further improved.

When setting the value Th to telephones other than the SLT 30, the value Th for each of a plurality of telephones is updated by executing the procedure shown in FIG. 2, and the updated values for each of these telephones are stored in the management memory 15M.

In the above embodiment, generation of request to start/end the test, display of the operation instruction and display of its result are made at the extension telephone 20. However, the present invention is not limited to this processing. For example, the request for test may be issued by dialing a specific number at the SLT 30, and an unit for outputting a verbal guidance may be arranged in the main unit 1, so that instruction of the operation procedure and notification of the set value may be accomplished by means of a prerecorded voice.

The present invention may be applied to either a system constituted by a plurality of equipments or an apparatus consisting of a single equipment. Also, the present invention may be applied to a case wherein the invention is attained by supplying a program to the system or apparatus. In this case, a storage medium that stores the program according to the present invention constitutes the present invention. By loading the program from the storage medium to the system or apparatus, the system or apparatus operates in a predetermined way.

The preferred embodiment of the present invention has been described. However, the present invention is not limited to the arrangement of the above embodiment, and various modifications may be made within the scope of the appended claims.

What is claimed is:

1. A method of detecting termination of communication, comprising the steps of:

detecting an on-hook operation of a terminal:

measuring an on-hook period during a setting operation based on a detection result in said operation detecting step;

setting a threshold value on the basis of the on-hook period during the setting operation;

measuring an on-hook period during communication; and detecting the termination of communication on the basis of a comparison result between the on-hook period during the communication and the threshold value.

2. The method according to claim 1, wherein the termination detecting step includes the step of distinguishing the termination of communication from a request to hold said communication, on the basis of the comparison result between the on-hook period during the communication and the threshold value.

3. The method according to claim 1, further comprising the requesting step of requesting another on-hook operation on the basis of the on-hook period during the setting operation.

4. The method according to claim 3, wherein the requesting step requests said operation in a visible or audible fashion.

5. The method according to claim 1, further comprising the step of visibly or audibly requesting an on-hook operation for said measuring.

6. The method according to claim 1, further comprising the step of restricting communications during said setting operation.

7. The method according to claim 1, further comprising the step of requesting a setting mode of a second communication terminal from a first communication terminal.

8. The method according to claim 1, further comprising the step of displaying an instruction which corresponds to a state of a second communication terminal, on a first communication terminal.

9. A communication apparatus comprising:

connection means for connecting a communication terminal; and first detection means for detecting termination of communication of the communication terminal, wherein said first detection means comprises:

second detection means for detecting an on-hook operation of the communication terminal:

measuring means for measuring an on-hook period of the communication terminal based on a detection result by said second detection means; and memory means for storing a threshold value which is set based on the on-hook period measured by said measuring means during a setting operation, and said first detection means detects the termination of a communication on the basis of a comparison result between the on-hook period measured by said measuring means during communication, and the threshold value stored in said memory means.

10. The apparatus according to claim 9, wherein said first detecting means includes means for distinguishing the termination of communication from a request to hold the communication, on the basis of the comparison result between the on-hook period during the communication and the threshold value.

11. The apparatus according to claim 9, further comprising requesting means for requesting another on-hook operation on the basis of the on-hook period during the setting operation.

12. The apparatus according to claim 1, wherein said requesting means requests the operation in a visible or audible fashion.

13. The apparatus according to claim 9, further comprising means for visibly or audibly requesting an on-hook operation for said measuring.

14. The apparatus according to claim 9, further comprising means for restricting communications during said setting operation.

15. The apparatus according to claim 9, further comprising means for requesting a setting mode of a second communication terminal from a first communication terminal.

16. The apparatus according to claim 9, further comprising means for displaying an instruction which corresponds to a state of a second communication terminal on a first communication terminal.

17. A method of detecting termination of communication, comprising the steps of:

detecting an on-hook operation of a terminal;

measuring an on-hook period during a setting operation based on a detection result in said detecting step;

setting a threshold value on the basis of the on-hook period during the setting operation;

measuring an on-hook period during communication; and controlling the communication on the basis of a comparison result between the on-hook period during the communication and the threshold value.

18. The method according to claim 17, wherein the controlling step includes a step of distinguishing the termination of communication from a request to hold the communication, on the basis of the comparison result between the on-hook period during the communication and the threshold value.

19. The method according to claim 17, further comprising a requesting step of requesting another on-hook operation on the basis of the on-hook period during the setting operation.

20. The method according to claim 19, wherein the requesting step requests the operation in a visible or audible fashion.

21. The method according to claim 17, further comprising a step of visibly or audibly requesting an on-hook operation for said measuring.

22. The method according to claim 17, further comprising a step of restricting communications during said setting operation.

23. The method according to claim 17, further comprising a step of requesting a setting mode of a second communication terminal from a first communication terminal.

24. The method according to claim 17, further comprising a step of displaying an instruction which corresponds to a state of a second communication terminal, on a first communication terminal.

25. A communication apparatus comprising:

connection means for connecting a communication terminal;

detection means for detecting an on-hook operation of the communication terminal;

measuring means for measuring an on-hook period of the communication terminal based on a detection result by said detection means; and memory means for storing a threshold value which is set based on the on-hook period measured by said measuring means during a setting operation, and control means for controlling a communication on the basis of a comparison result between the on-hook period measured by said measuring means during the communication, and the threshold value stored in said memory means.

26. The apparatus according to claim 25, wherein said controlling means includes means for distinguishing the termination of communication from a request to hold the communication, on the basis of the comparison result between the on-hook period during the communication and the threshold value.

27. The apparatus according to claim 25, further comprising requesting means for requesting another on-hook operation on the basis of the on-hook period during the setting operation.

28. The apparatus according to claim 27, wherein said requesting means requests the operation in a visible or audible fashion.

29. The apparatus according to claim 25, further comprising means for visibly or audibly requesting an on-hook operation for said measuring.

30. The apparatus according to claim 25, further comprising means for restricting communications during said setting operation.

31. The apparatus according to claim 25, further comprising means for requesting a setting mode of a second communication terminal from a first communication terminal.

32. The apparatus according to claim 25, further comprising means for displaying an instruction which corresponds to a state of a second communication terminal on a first communication terminal.

* * * * *

UNITED STATES PATENT AND TRADEMARK OFFICE
CERTIFICATE OF CORRECTION

PATENT NO. : 5,915,014
DATED : June 22, 1999
INVENTOR(S) : Katsuhiro Kakizawa

Page 1 of 1

It is certified that error appears in the above-identified patent and that said Letters Patent is hereby corrected as shown below:

Column 1,
Line 50, delete "provide system" and insert therefor -- provide a system --.

Column 2,
Line 61, delete "(step s8)." and insert therefor -- (step S8). --.
Line 64, delete "T>Th," and insert therefor -- T<Th, --.

Column 3,
Line 32, delete "if $T_{ON}$>Th," and insert therefor -- if $T_{ON}$<Th, --.
Line 34, delete "if $T_{ON} \leq$Th," and insert therefor -- if $T_{ON} \geq$Th, --.
Line 54, delete "if T>Th" and insert therefor -- if T<Th --.

Column 4, claim 1,
Line 26, delete "terminal:" and insert therefor -- terminal; --.

Column 5, claim 9,
Line 3, delete "terminal:" and insert therefor -- terminal; --.

Column 5, claim 12,
Line 25, delete "claim 1," and insert therefor -- claim 11, --.

Signed and Sealed this

Sixth Day of November, 2001

*Attest:*

NICHOLAS P. GODICI
*Attesting Officer*     *Acting Director of the United States Patent and Trademark Office*